Sept. 29, 1953 J. C. CARTER 2,653,832
UNDERWING FUELING NOZZLE AND VALVE FOR AIRCRAFT
Filed Oct. 25, 1946 4 Sheets-Sheet 2

INVENTOR
JAMES COOLIDGE CARTER
BY
Kenyon & Kenyon
ATTORNEYS

Sept. 29, 1953 J. C. CARTER 2,653,832
UNDERWING FUELING NOZZLE AND VALVE FOR AIRCRAFT
Filed Oct. 25, 1946 4 Sheets-Sheet 3

INVENTOR
JAMES COOLIDGE CARTER
BY
Kenyon & Kenyon
ATTORNEYS

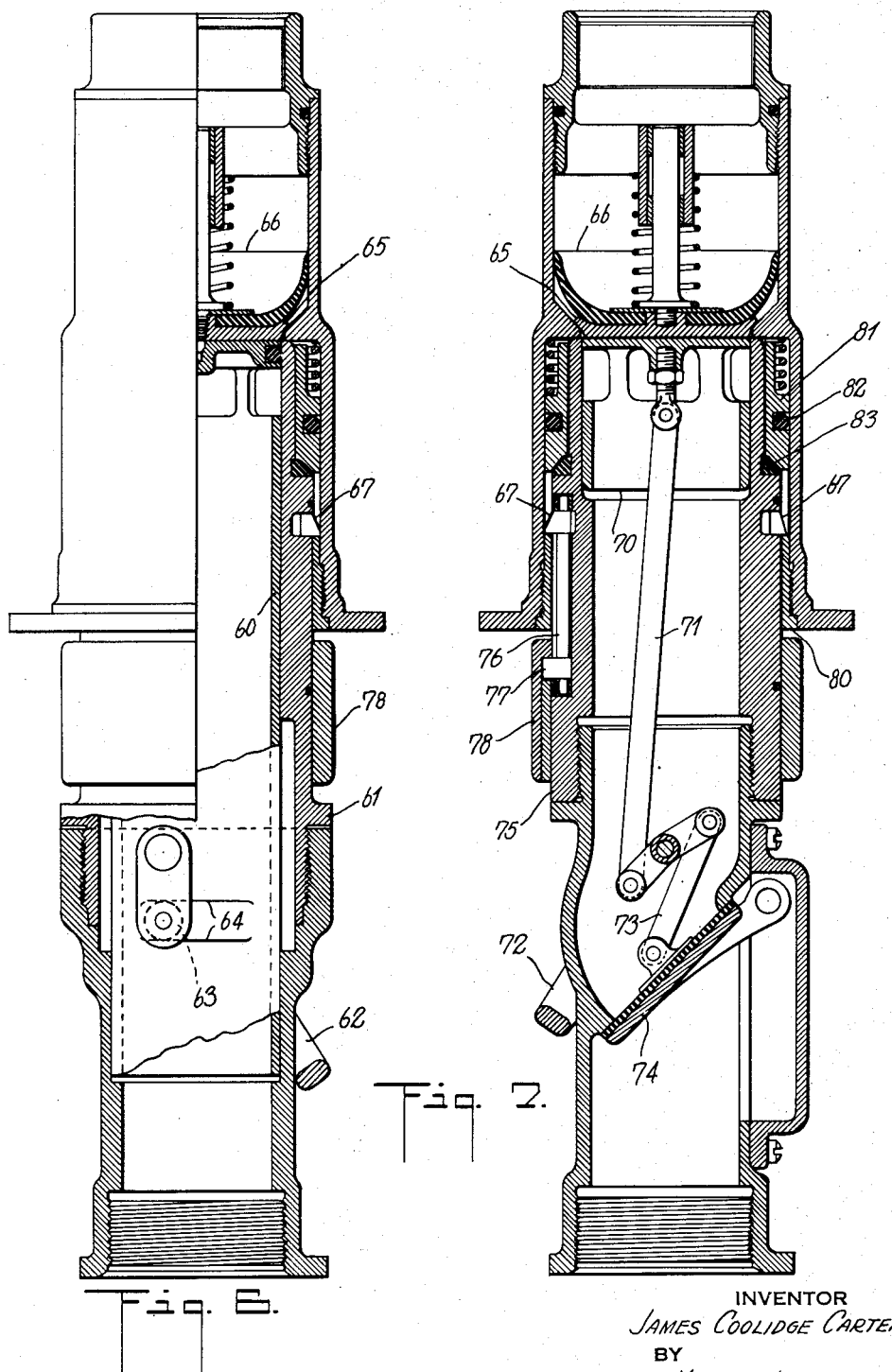

Patented Sept. 29, 1953

2,653,832

UNITED STATES PATENT OFFICE 2,653,832

UNDERWING FUELING NOZZLE AND VALVE FOR AIRCRAFT

James Coolidge Carter, Los Angeles County, Calif., assignor to The J. C. Carter Company, Pasadena, Calif., a corporation of California Application October 25, 1946, Serial No. 705,545

12 Claims. (Cl. 284—18)

This invention relates to fueling nozzles and valves and more particularly to fueling nozzles and valves adapted for under-wing fueling of aircraft.

With the advent of larger transport aircraft with fuel capacity of 5,000 gallons or more, it has become apparent that the speed of fueling must be stepped up consistent with safety precautions and within practical operating limits. Many factors combine to make under-wing fueling the logical answer to the problem including increased height of aircraft wings from the ground; the safety of service crew, passengers, and the aircraft itself; the fact that the use of ladders and stands cause attendant damage to the thin skin of leading edges and tops of wings; and the saving in fueling time.

Accordingly, one object of this invention is to provide a fueling nozzle and valve adapted for under-wing fueling of aircraft.

Another object of this invention is to provide such a fueling nozzle and valve which will automatically seal both the fueling hose and aircraft tank upon being disconnected.

Another object of this invention is to provide such a fueling nozzle and valve which will not allow fuel to flow until the system is properly connected to the aircraft tank.

Still another object of this invention is to provide a fueling nozzle and valve of simple, compact construction and minimum weight.

Other and further objects will appear during the course of the following description when taken with the accompanying drawings in which:

Fig. 6 is a partially cut-away cross-sectional view of an alternative embodiment of this invention; and Fig. 7 is a cross-sectional view of another alternative embodiment of this invention.

The invention consists generally of a tank valve which is opened by means of a nozzle attachment which is affixed to the usual fueling hose and which is also provided with a valve, the opening of which opens the tank valve. This nozzle attachment is a unit which has on it safety means which prevent leakage or loss of fuel during fueling operations and at other times. Means are provided on the nozzle unit for connecting it to the tank. These means are correlated with locking mechanisms which cooperate with the valve in the nozzle so that the nozzle valve cannot be opened until it is attached to the tank and also so that the nozzle cannot be disconnected from the tank until the nozzle valve is closed.

The apparatus consists generally of a tank having an inlet housing with bayonet joint means and a filling attachment which includes a sleeve or nozzle member. An outer bayonet joint or sleeve member is rotatably mounted on the sleeve above mentioned. It has bayonet joint means on it to cooperate with the bayonet joint means on the housing to secure the sleeve to the housing. Means mounted on the sleeve or nozzle prevent the rotation thereof during its attachment to the housing and there is a manually actuated valve in the sleeve or nozzle for controlling fluid flow. Means are provided on the nozzle or sleeve which prevent the opening of this valve before the nozzle or inner sleeve is sealed with the housing by moving the outer bayonet joint or sleeve member to engaged position. There are also means which prevent the disengagement of this nozzle when the valve therein is open. These means lock the outer sleeve or bayonet joint member in engaged position when the nozzle valve is in open position.

Figure 1:
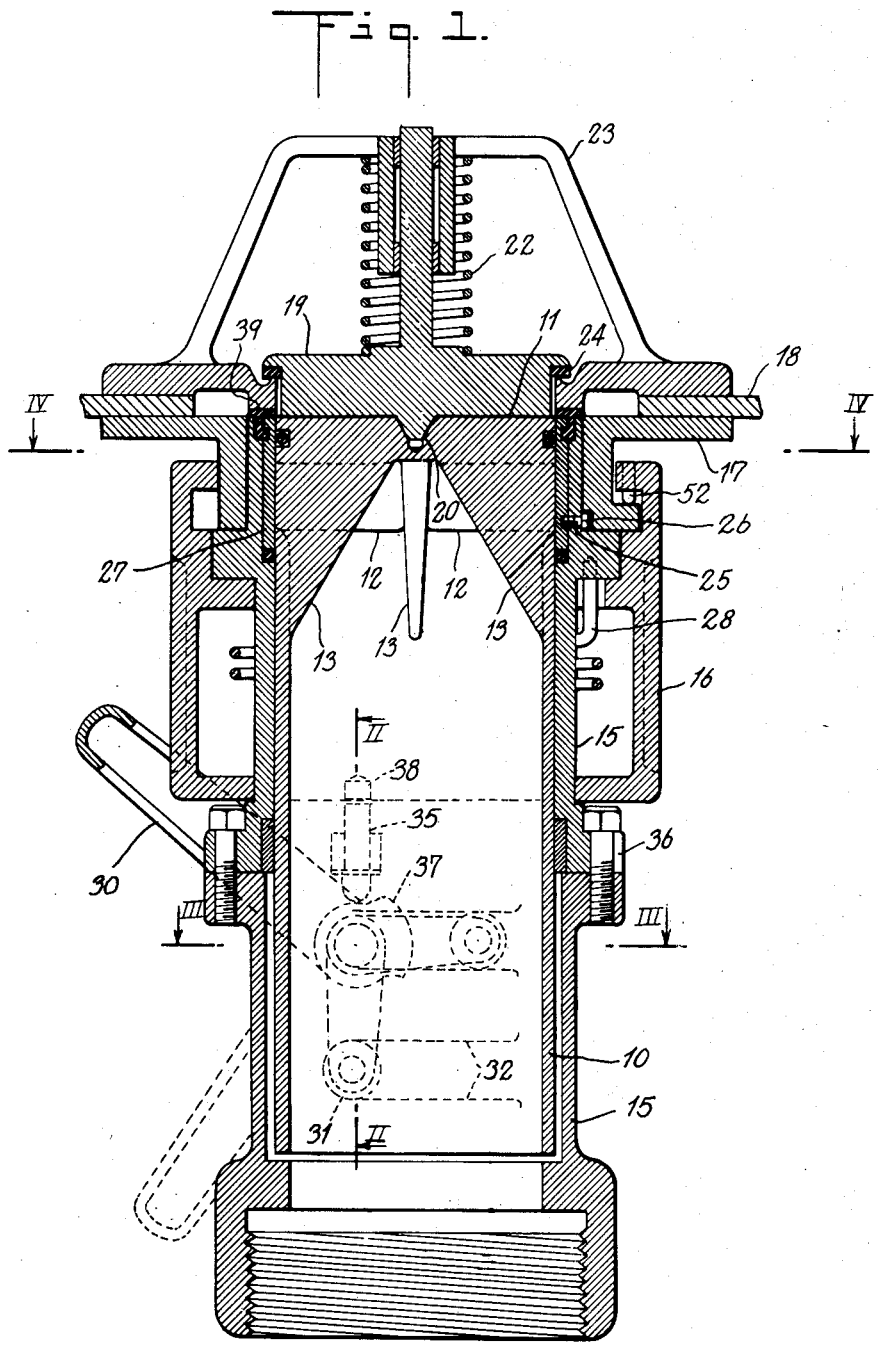
Fig. 1 is a cross-sectional view of a fueling nozzle and valve embodying this invention.

As shown in Fig. 1 there is a cylindrical member or valve 10 which is closed at its terminal end 11 and ported with lateral ports 12. Fins 13 are used to provide mechanical rigidity.

The valve or member 10 slides within a cylindrical sleeve member 15 in a telescopic fashion. The member 15 is cast of two separate halves joined as shown for ease of assembly of the unit.

The end of the member 15 adjacent the terminal end 11 is provided with a bayonet joint member or outer sleeve member 16, which engages a corresponding inlet housing or bayonet joint member 17 which is attached to the under side 18 of the aircraft wing tank.

An aircraft tank valve is provided in the wing tank extending through the under side 18 so that the face of its valve closure member 19 abuts and is aligned with the terminal end 11 of the valve member 10. This alignment is ensured by means of a centering pin 20 which fits into a corresponding groove in the member 10. This centering pin alignment feature, however, is optional and is not necessary to the operation of the unit.

Valve closure member 19 normally seals the aircraft wing tank since spiral spring 22 exerts a pressure between the member 19 and the spider 23 to hold a gasket 24 firmly in place, thus sealing the valve opening.

Three guiding or locking pins 25 project outwardly from the cylindrical sleeve member 15 and fit into corresponding keyways 26 of the bayonet joint member 17. These pins and corresponding keyways are preferably located equidistant one from the other around the periphery of the nozzle. When the nozzle is placed in position for sealing on the tank the engagement of the pins 25 in the keyways 26 of the bayonet joint member 17 prevents rotation of the cylindrical sleeve member 15 during attachment by means of the turning of the bayonet joint member or outer sleeve 16 which is rotatable about the sleeve member 15 into locking engagement with the member 17.

As shown, each pin 25 is threaded through member 15 into a wearing sleeve 27, which is disposed between the member 10 and the member 15 at their terminal ends.

A torsion spring 28 is provided between the member 15 and the bayonet joint member 16 to normally hold the member 16 in a disengaged position; that is, not in the position which it occupies when engaged or connected to member 17.

A bail type handle bell crank 30 extends from the member 15 ending in a bearing 31 which slidably engages guides 32 on the outer periphery of the member 10. As shown, when the bell crank 30 is moved to its downward position, indicated in dotted lines, the bearing 31 slides to the right in guides 32 forcing guides 32, and consequently the inner member 10, upwardly. This forces the valve member 19 inwardly and exposes the ports 12 and allows fuel to flow into or from the aircraft wing tank.

A safety interlocking device is provided. It consists of a pin 35 secured in the flange 36 which is formed on the lower end of the upper half of the member 15. The butt end of the pin 35 rests against a portion of the bell crank 30, which is extended outwardly to form a cam or operator 37 as shown. The other end of the pin 35 is adapted to slide into a corresponding hole 38 in the bayonet joint member 16 when the member 16 is in its fully engaged position.

The lower end of the member 15 is threaded to receive a standard hose coupling and suitable gaskets are provided between various components of the nozzle. The gasket 39 provides a seal between the terminal end of the member 15 and the ring-shaped tank member surrounding the valve closure member 19, even though manufacturing tolerances result in a substantial variation in fit between these members. The construction of this gasket 39 ensures that when it is compressed it will not expand laterally to interfere with the operation of either the bayonet joint member 17 or the telescoping member 10.

All gaskets included in the various embodiments of this invention as disclosed and illustrated are preferably of a fluid-resistant synthetic rubber such as Thiokol for gasoline or Neoprene for oils.

The ports 12 are normally sealed within the outer member 15 by the wearing sleeve 27. The bayonet joint member 16 is normally held in its disengaged position by the torsion spring 28. The combination of the cam 37, the pin 35, and the corresponding hole 38 prevents the bell crank 30 from being moved to open the nozzle when the parts are in this position. Conversely, once the bayonet joint members 16 and 17 are in fully engaged position the nozzle can be opened. When it is open, the cam 37 moves the pin 35 into the hole 38. As long as the nozzle remains open, this keeps the bayonet joint member from being moved to disengaged position, and it is only when bell crank lever 30 is moved to close the nozzle that the spring loaded valve member 19 can be opened and this only by external mechanical pressure such as is applied when the member 10 is forced upwardly.

Figure 2:
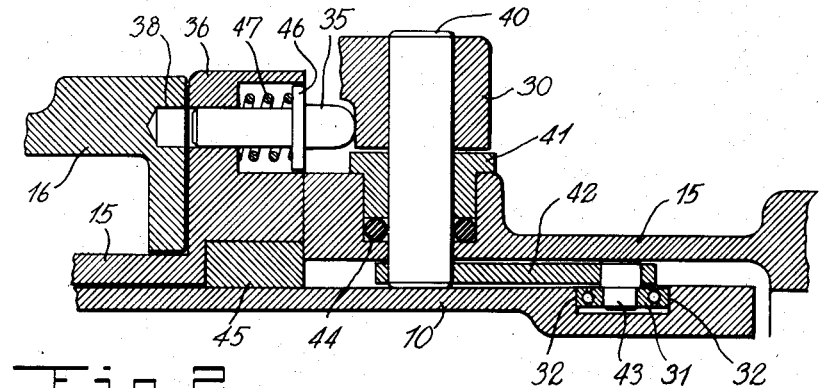
Fig. 2 is a cross-sectional view taken through vertical plane II—II of Fig. 1.

Fig. 2 shows more detail of the bell crank 30 and the interlocking device between it and the bayonet joint member 16, all of which are mounted on the nozzle. A pin 40 extends through the lower end of the bail type handle of bell crank 30 through bearing 41 and the wall of member 15 and through one end of pin crank member 42. The other end of the crank member 42 is secured to one end of a pin 43 on which the bearing 31 is mounted. The bearing 31 can rotate between the guides 32 as shown.

The pin 40 is secured to the inlet of the bell crank 30 and crank member 42 by any suitable means, such as keying. A gasket 44 is provided to seal fluid within the nozzle. The bearing 45, which is preferably of brass, provides a bearing surface between members 10 and 15.

The interlocking pin 35 is of larger diameter at its butt end to retain a washer 46 thereon. A spiral spring 47 is positioned adjacent washer 46 and in the recessed portion of flange 36 to hold the pin 35 normally against the bell crank 30. As previously explained, the pin 35 can be forced into hole 38 in the bayonet joint member 16 by means of the cam portion 37 of the crank 30.

Figure 3:
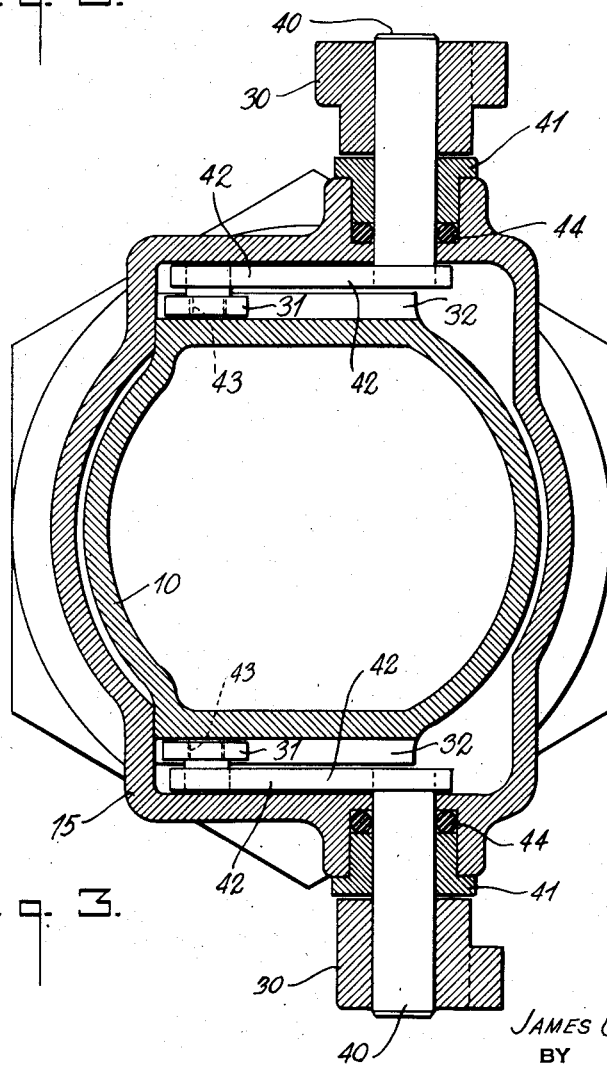
Fig. 3 is a cross-sectional view taken through horizontal plane III—III of Fig. 1 with the nozzle in the operating position.

Fig. 3 shows more detail of the nozzle in cross section. It shows the interrelationship of the members 10 and 15 and the bell crank 30.

Figure 4:
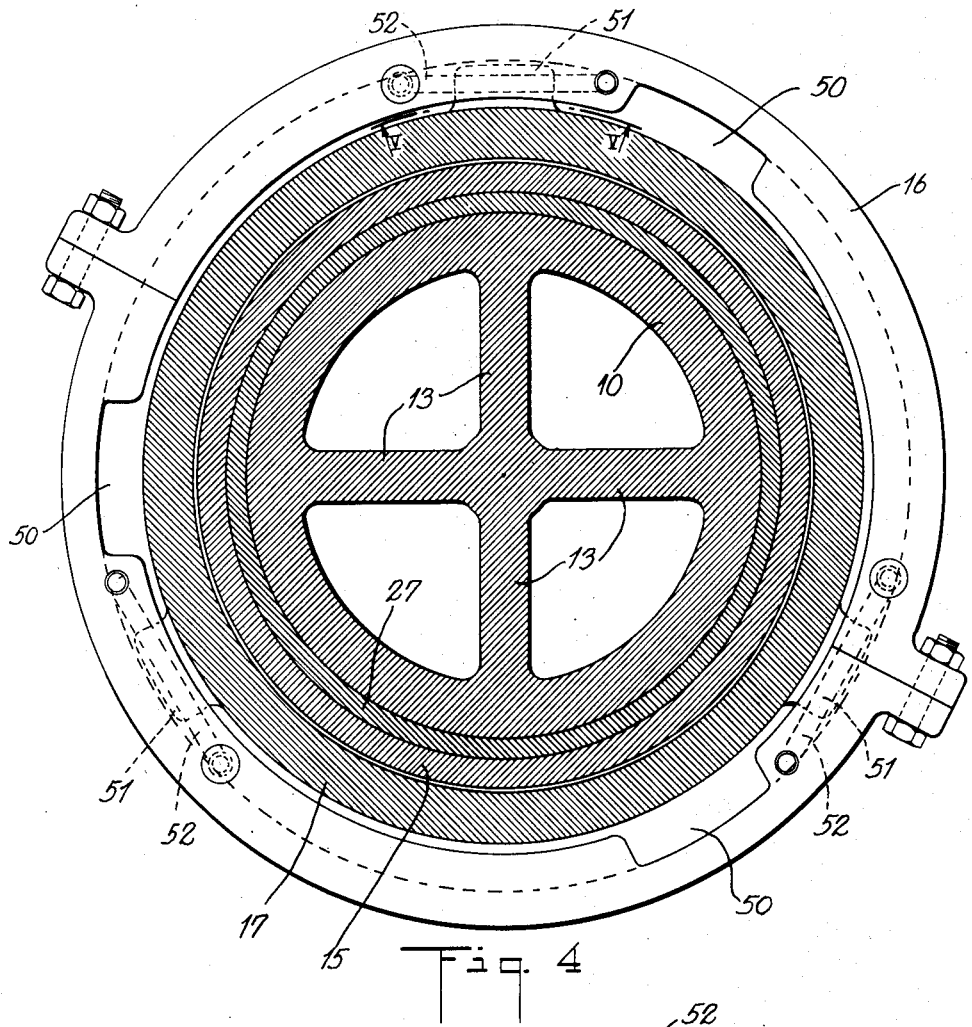
Fig. 4 is a cross-sectional view taken through horizontal plane IV—IV of Fig. 1.

Fig. 4 shows in cross section details of the bayonet joint connection. The slots 50 are provided in the bayonet joint member 16. The lugs 51 of the bayonet joint member 17 fit into these slots. The member 16 can then be rotated to its engaged position and it is held there by means of springs 52.

The member 16 is cast in two halves and suitably joined as shown for ease of assembly of the unit.

Figure 5:
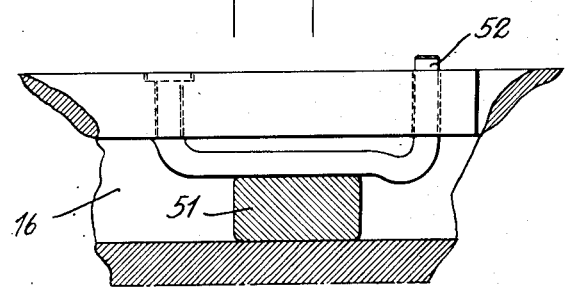
Fig. 5 is a developed view along line V—V of Fig. 4.

Fig. 5 shows the detailed construction of the spring 52 and the manner in which it holds the lug 51 in engaged position relative to the bayonet joint member 16, the hump on the spring serving as a stop.

It will be apparent that when this filling attachment or nozzle is used it provides all requisite safeguards for preventing leakage of the fuel. The valve in the tank keeps the tank closed against the loss of fuel. Until the nozzle is connected, the inner valve member 10, which is employed to open the valve in the tank, cannot be moved to position to open the valve tank until the bayonet joint member 16 is moved to engaged position. The inner member 10 may then be forced into the tank to open the valve and expose its ports. However, there is no opportunity for loss of gasoline since the nozzle is connected to the tank by the bayonet joint. There is no danger of the nozzle being disconnected from the tank until the valve member 10 is moved to closed position. When this is done, the bayonet joint member may be released. However, since the valve member 10 has been retracted the valve in the tank is closed and similarly the valve in the nozzle is closed so there can be no leakage of fuel.

The nozzle is a self-contained unit. All of the necessary safety features for maintaining the nozzle in its closed position until it is affixed to the tank are included in this unit. The tank unit can thus be made of minimum weight and all of the parts involved in the safety mechanism remain on the nozzle unit where they may be easily serviced and inspected, thus eliminating the necessity for the waste of time necessary for inspecting such units prior to fueling a plane which has landed for fueling and which may be in a hurry to leave. Furthermore, the parts of the safety mechanism mounted exclusively on the nozzle are not subject to injury or damage such as they might encounter were they mounted on a plane.

In Fig. 6 is shown an alternative embodiment of this invention, inner cylindrical member 60 being ported at its terminal end and sliding within outer member 61 as previously described. The movement of bell crank 62 causes ballbearing 63 to slide in guides 64 on the outer periphery of inner member 60, forcing inner member 60 out of outer member 61 in a manner previously described. Spring loaded valve member 65 has secured above it a gasket 66 of the shape shown, this gasket because of its shape serving as a secondary seal for the aircraft wing tank valve. In this embodiment, dogs 67 are utilized to secure the nozzle to the aircraft valve, these dogs being shown in more detail in Fig. 7.

In Fig. 7 is shown another alternative embodiment of this invention in which a relatively short inner member 70, similarly ported at its terminal end, has its movement controlled by a connecting rod 71 connected to bell crank 72. Bell crank 72 is also connected by another connecting rod 73 to flap type valve 74. Three dogs 67 are provided around the periphery of outer member 75, these preferably being spaced equi-distant one from the other, each dog being rigidly mounted on the upper end of a rod 76, rod 76 in turn being secured at its lower extremity to a one-tooth gear 77. Gear 77 meshes with a rack on the inner periphery of collar 78, and when the nozzle is placed within the corresponding aperture of the aircraft tank and collar 78 is rotated, dogs 67 move out to engage inner ring 80 which is secured to the inner periphery of the aperture, thus securing the nozzle in place. Spring loaded gasket member 81 is provided as shown with gaskets 82 and 83 to seal the joint.

The operation of the embodiments of Figs. 6 and 7 are similar to that of Fig. 1 and a suitable interlocking device, similar to that of Fig. 1, may be provided between the joint mechanism and the valve opening mechanism of Figs. 6 and 7 respectively. Numerous additional applications of the above-described principles will occur to those skilled in the art and no attempt has here been made to exhaust such possibilities. The scope of the invention is defined in the following claims.

What is claimed is:

1. Apparatus of the class described comprising inner and outer cylindrical telescoping members; said inner member including a closed terminal end, ports around its lateral periphery adjacent said terminal end, and a pair of parallel guides extending circumferentially around its lateral periphery; a bayonet joint member rotatably secured to the terminal end of said outer member; restraining means for normally maintaining said bayonet joint member in a disengaged position; and a crank arm extending through the wall of said outer member and ending in a bearing which slidably engages said parallel guides for forcing said inner member out of said outer member as said crank arm is revolved to thereby expose said ports which are normally sealed by said outer member.

2. Apparatus of the class described comprising inner and outer cylindrical telescoping members; said inner member including a closed terminal end, ports around its lateral periphery adjacent said terminal end, and a pair of parallel guides extending circumferentially around its lateral periphery; a bayonet joint member rotatably secured to the terminal end of said outer member; a crank arm extending through the wall of said outer member and ending in a bearing which slidably engages said parallel guides for forcing said inner member out of said outer member as said crank arm is revolved to thereby expose said ports which are normally sealed by said outer member; and a locking member adjacent a cam surface on the portion of said crank arm without said outer member; said bayonet joint member having an aperture adapted to receive said locking member when said joint member is in a fully engaged position; whereby said crank arm can be revolved only when said locking member can be seated in said aperture.

3. Apparatus of the class described comprising inner and outer cylindrical telescoping members; said inner member including a closed terminal end, ports around its lateral periphery adjacent said terminal end, and a pair of parallel guides extending circumferentially around its lateral periphery; a spring loaded valve whose outer face is adapted to be disposed adjacent said closed terminal end; a bayonet joint coupling for said valve and the terminal end of said outer member; a crank arm extending through the wall of said outer member to slidably engage said parallel guides for forcing said inner member out of said outer member as said crank arm is revolved to thereby expose said ports which are normally sealed by said outer member; and a locking member adjacent a cam surface on the portion of said crank arm without said outer member; said bayonet joint having an aperture adapted to receive said locking member when said joint is in a fully engaged position; whereby said crank arm can be revolved only when said locking member can be seated in said aperture.

4. A fueling nozzle comprising inner and outer cylindrical telescoping members; said inner member including a closed terminal end, ports around its lateral periphery adjacent said terminal end; a bayonet joint member rotatably secured to the terminal end of said outer member; a crank arm extending through the wall of said outer member and having an arm engaging said inner member for forcing said inner member out of said outer member as said crank arm is revolved to thereby expose said ports which are normally sealed by said outer member; and a cam surface on the portion of said crank arm without said outer member; a cam engaged lock, including means carried by said bayonet joint member adapted to be locked only when said joint member is in a fully engaged position; whereby said crank arm can be actuated only when the bayonet joint member is in fully engaged position.

5. A fueling valve and nozzle comprising an inner member and an outer cylindrical telescoping sealing member, said inner member including a closed terminal end, and a pair of parallel guides extending circumferentially of its lateral periphery; and a crank extending through and pivoted in an aperture in the wall of said outer member and having an arm inside said outer member slidably engaging said parallel guides for forcing said inner member out of said outer member as said crank is revolved to thereby open said valve said crank having an arm outside said outer member for actuating said valve.

6. A filling attachment for tanks having an inlet housing comprising an inner sleeve adapted to be connected with a fluid supply and adapted to be detachably connected to the inlet housing of the tank, an outer sleeve rotatably mounted on said inner sleeve, said outer sleeve having means cooperating with devices on said housing for securing said inner sleeve in sealed engagement with the housing means for preventing rotation of said inner sleeve during the attachment of the same to the housing, a manually actuated valve for controlling fluid flow from said inner sleeve, and means for preventing the opening of said valve before said inner sleeve is in sealed engagement with said housing.

7. A filling attachment for tanks having an inlet housing comprising an inner sleeve adapted to be connected with a fluid supply and adapted to be detachably connected to the inlet housing of the tank, an outer sleeve rotatably mounted on said inner sleeve, said outer sleeve having means cooperating with devices on said housing for securing said inner sleeve in sealed engagement with the housing means for preventing rotation of said inner sleeve during the attachment of the same to the housing, a manually actuated valve for controlling fluid flow from said inner sleeve, and means for preventing operation of the securing means for detaching the sleeve before said inner sleeve valve has been moved to closed position.

8. A filling attachment for tanks having an inlet housing comprising an inner sleeve adapted to be connected with a fluid supply and adapted to be detachably connected to the inlet housing of the tank, said sleeve having a valve seat, a valve adapted to engage said seat for controlling fluid flow from said inner sleeve, a shaft mounted in said inner sleeve, means actuated by said shaft for moving said valve to and from closed position, an outer sleeve rotatably mounted on said inner sleeve, means carried by said outer sleeve and cooperating with devices on said housing for securing said inner sleeve in sealed engagement with the housing, manual means for turning said shaft for opening and closing the valve, and means associated with said outer sleeve for preventing the turning of the shaft for opening of the valve before said inner sleeve is in sealed engagement with said housing.

9. A filling attachment for tanks having an inlet housing comprising an inner sleeve adapted to be connected with a fluid supply and adapted to be detachably connected to the inlet housing of the tank, said inner sleeve having a valve seat, a valve adapted to engage said seat for controlling fluid flow from said inner sleeve, a shaft mounted in said inner sleeve, means actuated by said shaft for moving said valve to and from closed position, an outer sleeve rotatably mounted on said inner sleeve, means carried by said outer sleeve and cooperating with devices on said housing for securing said inner sleeve in sealed engagement with the housing, manual means for turning said shaft for opening and closing said valve, and means associated with said manual valve, and means associated with said manual turning means for preventing operation of the outer sleeve for detaching the inner sleeve before said shaft has been turned so as to move the valve to closed position.

10. The combination of a tank having a housing secured to the bottom wall thereof, said housing having an inlet opening and a depending sleeve concentric to said opening and spaced outwardly therefrom to provide a seating ledge, said sleeve having holding lugs at spaced intervals thereon and a nozzle attachment including an inner sleeve adapted to fit within the sleeve on the housing and make sealed engagement with said seating ledge, said inner sleeve being connected with a fluid supply, an outer sleeve rotatably mounted on said inner sleeve and having means adapted to cooperate with said lugs on the housing sleeve for holding said inner sleeve in sealed engagement with the housing and a stop for limiting the rotation of the outer sleeve, and means for preventing rotation of said inner sleeve during attachment of the same to the housing, a valve mounted in said inner sleeve for controlling fluid flow from the inner sleeve to the tank, a shaft mounted in said inner sleeve, means actuated by the shaft for moving said valve to and from closed position and manual means for turning said shaft.

11. A nozzle unit for filling tanks comprising a conduit adapted to be connected with a fluid supply line and to engage a tank inlet, a valve telescopically disposed in said conduit comprising a telescoping member having a closed terminal end and side ports and adapted to be moved telescopically between a closed position within said conduit and an open position in which it projects from said conduit to expose said side ports, actuating means for said valve comprising a lever disposed externally of and on said conduit and movable between an open and a closed position, and means connecting said actuating means with said valve for moving the same between an open and a closed position when said actuating means are moved between open and closed positions, a coupling member movably mounted on and externally of said conduit for movement between an uncoupled position and a coupled position, said coupling member being adapted to engage coupling means associated with a tank inlet, first locking means mounted entirely on said conduit and actuating means and positioned to lock said valve in closed position, first holding means mounted on said coupling member positioned to engage and hold said first locking means in position to lock said valve in closed position when said coupling means is in uncoupled position, second locking means mounted entirely on said conduit and said coupling member and positioned to lock said coupling member in full coupled position and second holding means mounted on said actuating means and positioned to hold said second locking means in position to lock said coupling member in full coupled position when said actuating means are away from closed position.

12. A nozzle unit for filling tanks comprising a conduit adapted to be connected with a fluid supply line and to engage a tank inlet, a valve disposed in said conduit and adapted to be moved between a closed position and an open position, actuating means for said valve disposed externally of and on said conduit and movable between an open and a closed position, and means connecting said actuating means with said valve for moving the same between an open and a closed position when said actuating means are moved between open and closed positions, a coupling member movably mounted on and externally of said conduit for movement between an uncoupled position and a coupled position, said coupling member being adapted to engage coupling means associated with a tank inlet, first locking means mounted entirely on said conduit and actuating means and positioned to lock said valve in closed position, first holding means mounted on said coupling member positioned to engage and hold said first locking means in position to lock said valve in closed position when said coupling means is in uncoupled position, second locking means mounted entirely on said conduit and said coupling member and positioned to lock said coupling member in full coupled position and second holding means mounted on said actuating means and positioned to hold said second locking means in position to lock said coupling member in full coupled position when said actuating means are away from closed position.

JAMES COOLIDGE CARTER.

References Cited in the file of this patent

UNITED STATES PATENTS

| Number | Name | Date |
|---|---|---|
| 562,414 | O'Leary | June 23, 1896 |
| 833,672 | Butler | Oct. 16, 1906 |
| 865,713 | Lamaouroux | Sept. 10, 1907 |
| 879,880 | Landau | Feb. 25, 1908 |
| 889,952 | McGinley | June 9, 1908 |
| 939,211 | Brown | Nov. 9, 1909 |
| 1,350,885 | Rowe | Aug. 24, 1920 |
| 1,428,933 | Bean, Jr. | Sept. 12, 1922 |
| 1,465,648 | McNeill | Aug. 21, 1923 |
| 1,927,448 | Terry | Sept. 19, 1933 |
| 2,026,110 | Wheaton | Dec. 31, 1935 |
| 2,288,565 | Green | June 30, 1942 |
| 2,369,356 | Koehn | Feb. 13, 1945 |
| 2,370,182 | Morrow et al. | Feb. 27, 1945 |
| 2,384,628 | Krone et al. | Sept. 11, 1945 |
| 2,412,685 | Hoffman | Dec. 17, 1946 |

FOREIGN PATENTS

| Number | Country | Date |
|---|---|---|
| 130,759 | Switzerland | of 1929 |
| 678,125 | Germany | Nov. 23, 1937 |